(12) United States Patent
Han

(10) Patent No.: US 6,253,724 B1
(45) Date of Patent: Jul. 3, 2001

(54) CYLINDER LINER WITH OIL POCKET

(75) Inventor: Keum Tai Han, Taejon (KR)

(73) Assignee: Samyoung Machinery Co., Ltd. (KR)

( * ) Notice: Subject to any disclaimer, the term of this patent is extended or adjusted under 35 U.S.C. 154(b) by 0 days.

(21) Appl. No.: 09/455,077

(22) Filed: Dec. 6, 1999

(51) Int. Cl.⁷ ........................................................ F02F 1/16
(52) U.S. Cl. ......................................................... 123/193.2
(58) Field of Search ............................ 123/193.2, 193.1, 123/193.3; 384/293

(56) References Cited

U.S. PATENT DOCUMENTS

| | | | |
|---|---|---|---|
| 3,749,072 | * 7/1973 | Schweikher | 123/193.2 |
| 4,196,547 | 4/1980 | Keske. | |
| 4,258,084 | * 3/1981 | Hayden, Sr. | 123/193.2 |
| 5,357,921 | * 10/1994 | Katoh et al. | 123/193.2 |
| 5,701,861 | 12/1997 | Hegemier et al. | |
| 5,815,789 | 9/1998 | Akpan. | |
| 5,887,558 | * 3/1999 | Kampichler et al. | 123/193.2 |
| 5,931,038 | 8/1999 | Higashi. | |
| 6,012,973 | 1/2000 | Nagel. | |
| 6,095,690 | * 8/2000 | Niegel et al. | 384/293 |

* cited by examiner

*Primary Examiner*—Marguerite McMahon
(74) *Attorney, Agent, or Firm*—Knobbe, Martens, Olson & Bear LLP

(57) ABSTRACT

A cylinder liner is described which comprise a body and an oil pocket which is filled with lubrication oil. The body is made of iron cart. The oil pocket is formed on inner surface of the body and includes a plurality of recess rows which are arranged, in the diagonal direction, on the inner surface of the body. Each of recesses is reverse-dotted on the inner surface of the body by a knurling process.

2 Claims, 2 Drawing Sheets

CYLINDER LINER WITH OIL POCKET

FIELD OF THE INVENTION

The present invention relates to a cylinder liner mounted in cylinder of engine, and more specifically to a cylinder liner provided with oil pocket including a plurality of recesses which are filled with lubrication oil.

BACKGROUND OF THE INVENTION

In conventional industrial engine system, a cylinder liner is mounted in the cylinder of engine and adapted to prevent inner surface of the cylinder from wearing caused by a piston reciprocating in the cylinder. The inner surface of the cylinder liner which contacts with the piston is smoothly honed by honing machine. The inner surface of the cylinder liner is provided with a plurality of parallel recess lines which are filled with lubrication oil for lubricating interface between the inner surface of the cylinder and the outer surface of the piston reciprocating in the cylinder liner. All recess lines are intersected to form a plurality of diamond shapes. Generally, each of parallel recess lines is hatched by a hatch angle cross honing process, and cross angle of the recess lines which are intersected is 30 to 60 degrees. As the recess lines of the cylinder liner are filled with lubrication oil, the frictional resistance between the piston and the cylinder liner is reduced when the piston is reciprocated in the cylinder.

However, because the inner surface of the cylinder liner which is provided with a plurality of diamond-shaped recess lines has relatively low roughness of 0.8 to 2.2, the recess lines are easily worn out. Additionally, as the recess lines are lowered and the edges of the recess lines are sharpened, a plurality of diamond-shaped surfaces formed by the diamond recess lines are easily worn by the piston which is reciprocated in the cylinder liner.

As the recess lines is shallower and the lubrication oil is reduced, the lubrication oil is not sufficiently supplied and distributed onto the inner surface of the cylinder liner. Therefore, the piston is not smoothly reciprocated in the cylinder, the engine performance is not good, and also the cylinder liner has a short life time.

SUMMARY OF THE INVENTION

Accordingly, it is an object of the present invention to provide a cylinder liner with oil pocket which can sufficiently supply lubrication oil onto inner surface of the cylinder liner.

It is another object of the present invention to provide a cylinder liner with oil pocket that can be put in use for a prolonged period of time without premature wearing.

In a preferred embodiment of the invention, there is provided a cylinder liner with oil pocket which has a plurality of recesses formed on inner surface of the cylinder liner in which a piston is reciprocated. Each of recesses is reverse-dotted on the inner surface of the cylinder liner. Each of the recesses forms a plurality of recess rows which are arranged in the diagonal direction.

In the cylinder liner with oil pocket of the present invention, each of recesses is reverse-dotted on the inner surface of the cylinder liner, while the inner surface of the cylinder liner which contacts with the piston has a wide area of surface and the anti-wearing of the inner surface of the cylinder liner is increased. As the lubrication oil is sufficiently received and maintained in each of recesses, the lubrication performance between the piston and the cylinder liner and the engine performance are improved. Also, chips and/or impurities which may be generated in actuating of the engine are received in each of recesses, so that the premature wear of the cylinder liner and the piston can be prevented.

Additionally, the oil pocket and the process for forming the oil pocket are simple, and thus the cylinder liner is manufactured at relatively low cost.

DESCRIPTION OF THE DRAWINGS

These and other objects and advantages of the invention may be readily ascertained by referring to the following description and appended drawings in which.

DESCRIPTION OF PREFERRED EMBODIMENT

Figure 1:
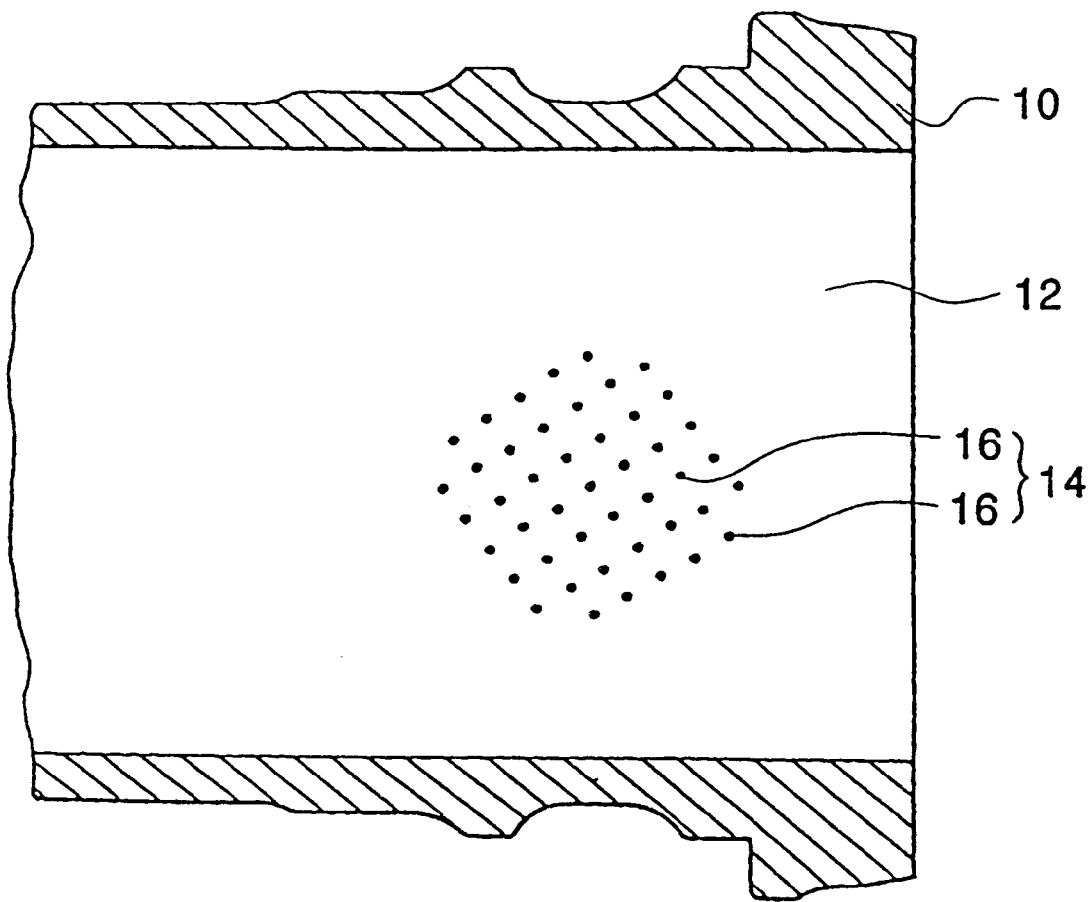
FIG. 1 is an enlarged view illustrating a portion of oil pocket formed on inner surface of a cylinder liner of the invention.

An embodiment of the invention will now be described, initially with reference to FIG. 1. In FIG. 1, a cylinder liner has a body 10 which is mounted into inner surface of cylinder in an engine (not shown). The body is preferably made of cast iron. An oil pocket 14 is formed on inner surface 12 of the body 10. The oil pocket 14 includes a plurality of recesses 16 which are reverse-dotted on the inner surface 12 of the body 10.

Preferably, the recesses 16 of the oil pocket 14 form a plurality of recess rows which are arranged in the direction of diagonal lines. For example, four recesses in neighboring recess rows forms diamond shape. More specifically, the recesses 16 are reverse-dotted and uniformly distributed on the body 10 from upper dead point to bottom dead point in the body 10 in which a piston is reciprocated.

Figure 2:
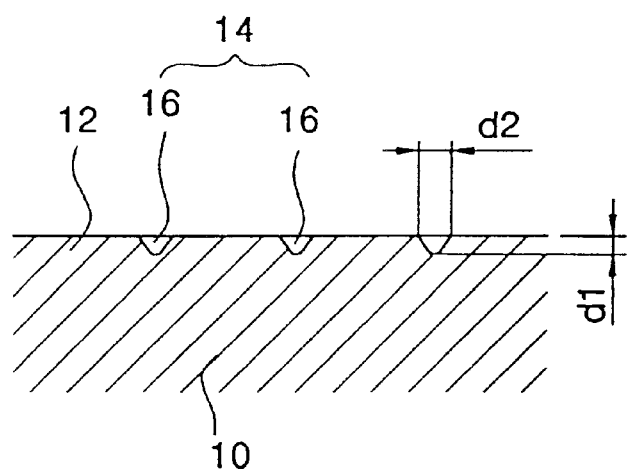
FIG. 2 is a partially enlarged sectional view illustrating the recesses of the oil pocket shown in FIG. 1.

As shown in FIG. 2, the diameter of each of recesses 16 in the body 10 is more than the depth thereof. Preferably, the depth d1 is 0.15 mm to 0.5 mm and the diameter d2 is 0.6 mm to 1.2 mm.

Figure 3:
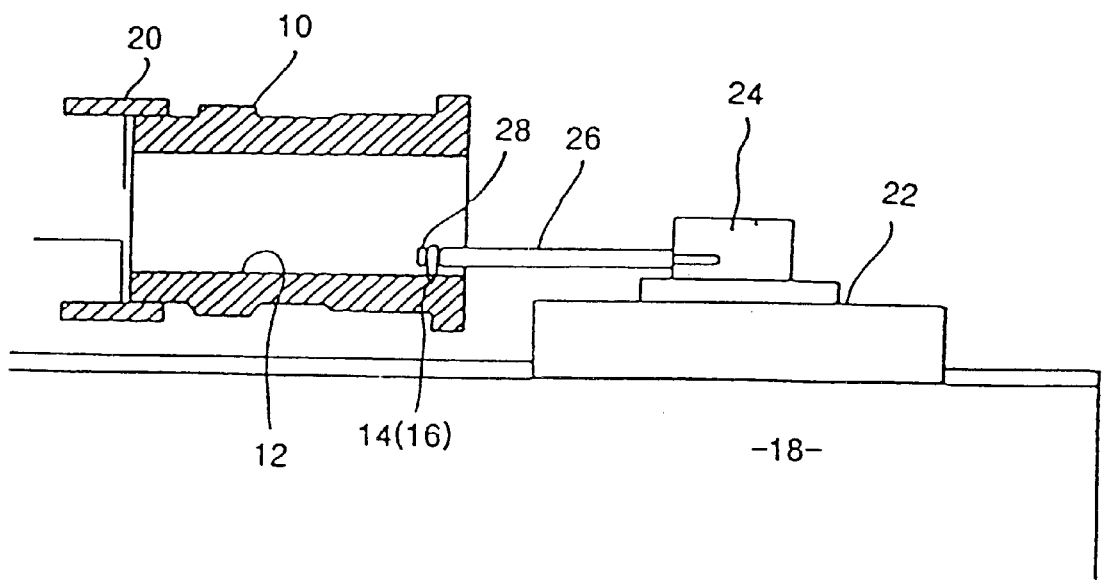
FIG. 3 is a side view illustrating an apparatus and process for forming the oil pocket on the cylinder liner of the invention.

Referring now to FIG. 3, there is a side view illustrating an apparatus for forming recesses. For example, the recesses 16 are formed on the inner surface 12 of the body 10 by a knurling machine shown in drawing. In general, such knurling machine includes a work bed 18 which is placed on the base or the earth. A chuck 20 for holding the body 10 of the cylinder liner is set on the work bed 18. A carriage 22 is movably set on the work bed 18. A tool rest 24 is mounted onto the carriage 22. The tool rest 24 is provided with an arbor 26. A knurling tool is mounted to the end of the arbor 26 to work the cylinder liner.

In order to work the cylinder liner by the knurling machine, the body 10 of the cylinder liner is held in the chuck 20 and the knurling tool 28 is secured to the end of the arbor 26. When the knurling machine operates, the carriage 22, the tool rest 24 and the arbor 26 are actuated automatically or manually, then each of recesses 16 is formed on the inner surface 12 by the knurling tool 28. Preferably, the knurling machine is actuated and controlled so that the recesses 16 can be reverse-dotted on the inner surface 12 and arranged in the diagonal direction thereon.

Alternatively, the process for forming recesses on the inner surface may include various working manners, for example, mechanical processing, electrical processing, chemical processing, electrochemical processing, and the others.

As the body 10 of the cylinder liner is mounted into the cylinder of any engine (not shown), each of recesses 16 in the body 10 is filled with lubrication oil. When the engine starts, the lubrication oil in recesses 16 is supplied between the outer surface of the piston and the inner surface of the cylinder liner, so that the frictional drag therebetween can be reduced. Also, a plurality of recesses 16 are uniformly and sufficiently reverse-dotted on the inner surface 12 of the cylinder liner, so that an optimal lubrication performance can be maintained between the piston and the cylinder liner.

Furthermore, as the chips which may be generated in the cylinder are received in recesses 16 of the oil pocket 14, the piston and the cylinder liner are not injured or damaged by the chips, and an abnormal wear of the cylinder liner and the piston can be prevented.

As set forth herein above, the present invention provides a cylinder liner with oil pocket that reverse-dotted recesses of the oil pocket are maintained without wearing, the lubrication oil is sufficiently maintained in each of recesses and supplied between the outer surface of the piston and the inner surfaces of the cylinder liner, and thus the lubrication performance of the piston and the engine performance are improved. Also, the chips are received into each of recesses, so that the piston can be smoothly reciprocated in the cylinder liner without premature wearing of the cylinder and the piston, and the cylinder liner can be put in use for a prolonged period of time.

While the invention has been particularly shown and described with reference to a preferred embodiment thereof, it will be understood by those skilled in the art that the foregoing and other changes in form and details can be made therein without departing from the spirit and scope of the invention.

What is claimed is:

1. A cylinder liner mounted into a cylinder of engine, comprising, a body inserted into the cylinder and made of cast iron; and an oil pocket formed on an inner surface of said body for receiving lubrication oil, wherein said oil pocket having a plurality of recess rows which are arranged, in a diagonal direction, on the inner surface of the body between the top dead point and the bottom dead point of a piston which is reciprocated in the body, wherein each of the recesses forming said recess rows is reverse-dotted on the inner surface of the body by a knurling process.

2. A method of manufacturing a cylinder liner, comprising:

providing a cylinder liner comprising a surface defining a cylindrical space within which a piston is adapted to reciprocate; and forming a plurality of recesses on the surface such that each surface can retain lubricant if applied, wherein the plurality of recesses is formed by at least one of the group consisting of a mechanical processing, an electrical processing, a chemical processing, and an electrochemical processing, and wherein the process used in the formation of the plurality of recesses is knurling.

* * * * *